United States Patent
Yamashita

(10) Patent No.: US 7,176,616 B2
(45) Date of Patent: Feb. 13, 2007

(54) ELECTROLUMINESCENCE DEVICE HAVING PHOSPHOR PARTICLES WHICH GIVE DONOR-ACCEPTOR TYPE LUMINESCENCE

(75) Inventor: Seiji Yamashita, Minami-ashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 27 days.

(21) Appl. No.: 10/776,633

(22) Filed: Feb. 12, 2004

(65) Prior Publication Data

US 2004/0227457 A1    Nov. 18, 2004

(30) Foreign Application Priority Data

Feb. 14, 2003    (JP) .............. 2003-037476

(51) Int. Cl.
*H01J 1/62*    (2006.01)
(52) U.S. Cl. ...................... 313/503; 428/917
(58) Field of Classification Search ........ 313/503, 313/504; 428/690, 917
See application file for complete search history.

(56) References Cited

U.S. PATENT DOCUMENTS

| | | | |
|---|---|---|---|
| 6,077,458 A * | 6/2000 | Shiiki et al. | 252/301.4 R |
| 6,819,041 B2 * | 11/2004 | Kajiwara | 313/496 |
| 2003/0098644 A1 * | 5/2003 | Thomas | 313/503 |
| 2004/0043191 A1 * | 3/2004 | Zovko | 428/138 |

FOREIGN PATENT DOCUMENTS

| | | |
|---|---|---|
| JP | 6-306355 | 11/1994 |
| JP | 8-183954 | 7/1996 |

* cited by examiner

*Primary Examiner*—Joseph Williams
*Assistant Examiner*—Bumsuk Won
(74) *Attorney, Agent, or Firm*—Sughrue Mion, PLLC

(57) ABSTRACT

An electroluminescence device, including phosphor particles, which phosphor particles give donor-acceptor type luminescence, and have an average equivalent sphere diameter of 1.0 μm or more and 12.0 μm or less and a coefficient of variation of equivalent sphere diameters of 3% or more and 30% or less.

7 Claims, 4 Drawing Sheets

ELECTROLUMINESCENCE DEVICE HAVING PHOSPHOR PARTICLES WHICH GIVE DONOR-ACCEPTOR TYPE LUMINESCENCE

FIELD OF THE INVENTION

The present invention relates to electroluminescence particles (EL particles), and to an alternating-current-driven (AC-driven), dispersion-type inorganic electroluminescence device (EL device) giving high light-emission luminance at low voltage.

BACKGROUND OF THE INVENTION

AC-driven electroluminescence materials (devices) have been developed as flat-panel-type light-emitting light sources. As various electronic devices have been diversifying in recent years, electroluminescence devices have been used as display devices thereof. Further, they have also been used as decorative display materials. In addition to the above, large-sized flat panel displays have also been developed in-recent layers.

Electroluminescence materials (devices) are roughly classified into two types: particle-dispersion-type electroluminescence materials, wherein phosphor particles (electroluminescence particles) are dispersed in a highly dielectric substance; and thin-film-type devices, wherein a phosphor thin film is formed, mainly by vapor deposition, to be sandwiched between dielectric layers. The former particle-dispersion-type electroluminescence devices have characteristics that, for example, they can easily be made into a large area as a uniform area light source. However, they have problems that high voltage of 100 V or more is occasionally required for luminescence, and further, the luminance and efficiency are low (see, for example, "ELECTROLUMINESCENCE DISPLAY" (written by Toshio Inoguchi, published by Sangyo Tosho; July 1991), and "DISPLAY" (edited by Syunsuke Kobayashi and Kaichi Toyama, published by Maruzen Co., Ltd.; March 1993)).

In the particle-dispersion-type device, a luminescence layer, comprising phosphor powder contained in a high-dielectricity polymer, such as a fluorine-series rubber or a polymer having a cyano group, is arranged between a pair of electrically conductive electrode sheets, at least one of which is light-transmissible. In any ordinary embodiment of the particle-dispersion type, a dielectric layer is arranged, to prevent dielectric breakdown. The dielectric layer comprises powder of a ferroelectric substance, such as barium titanate, contained in a highly dielectric polymer. The phosphor powder used in this type generally comprises ZnS, as a host material thereof, which is doped with an appropriate amount of ions of Cu, Mn, Ce, Cl, Al, or the like.

Examples of an electron-trapping center, which is the so-called donor, include Cl and Al. Examples of a positive hole-trapping center, which is the so-called acceptor, include Cu and Zn holes. In the field of the present art, for example, luminescence between Cl or Al, which trapped electrons, and Cu, which trapped positive holes, is called DA luminescence (donor-acceptor luminescence); and luminescence between Cl or Al, which trapped electrons, and Zn electron holes, which trapped positive holes, is called SA luminescence (self-activated luminescence).

These are described in detail in "Phosphor Handbook," Chapter 2, 2–7, pp. 143–157, (edited by the Phosphor Research Society (Keikotai Dogakukai), published by Ohmsha, Ltd.; December 1987). As a simple determination method, it is useful to evaluate luminescence at a low temperature. In the case of donor-acceptor type luminescence, luminous efficiency reduces when a temperature is lowered, since luminescence occurs as a result of a recombination process involving a change in transition energy of the electrons (holes). This can be confirmed by electroluminescence, but as a simpler method, the same result is obtained with photoluminescence as well. For luminescence given in the transition in the luminescence center of impurities such as Mn and Eu, in contrast, there is a lower probability of non-radiative recombination. In general, the luminescence intensity is increased at a low temperature and a variation in thermal energy level between radiative transition states is reduced, giving a luminescence with a narrow half-value width. For the individual particles as well, the luminescence change can be examined through the observation on the luminescence condition with an optical microscope, for instance, at a room temperature and a liquid nitrogen temperature.

These electroluminescence particles are indeterminate-form particles that are usually of particle size 20 μm or more, and they are formed by a firing process (solid-phase reaction) in a high-temperature furnace at 900° C. or more. Accordingly, no generation format wherein nucleus formation and growth are separated can be taken, and further, convection of particles cannot be expected in a growing crucible, either. Therefore, the growth is easily affected by the locality of temperature or atmosphere, and the size distribution of the particles gets broader as the size becomes larger. In other words, as the growth advances more and more, large particles become larger and small particles grow more slowly. Thus, the size distribution gets broad. As a result, the distribution of luminous property between particles, gets large; and accordingly, high luminance cannot be obtained unless high voltage is applied.

Since a high-temperature process is not required to produce the particle dispersion type, this type has following advantageous characteristics: A flexible device having a plastic as a substrate can be produced, the type can be produced at low costs through relatively simple steps without using a vacuum machine, and the luminous color of the device can easily be adjusted by mixing multiple kinds of phosphor particles that give different luminous colors. Thus, this type is applied to back lights in LEDs and so on, and display devices. However, the light-emission luminance and the efficiency thereof are low, and high voltage of 100 V or more is required for high-luminance luminescence. As a result, the scope to which the particle dispersion type can be applied is restricted, and it is therefore desired to improve the light-emission luminance and the luminous efficiency further.

As a measure to increase the light-emission luminance and to decrease the voltage for luminescence, it is widely known to make the film thickness of the phosphor layer thinner, thereby making the electric field in the phosphor layer higher. Usually, however, when the phosphor particles are of size 20 μm or more, there is a problem: it is difficult to form a smooth phosphor layer with a film thickness controlled to 60 μm or less, by coating. Occurrence of unevenness (irregularities) is inevitable, and this results in deteriorated voltage-withstand performances, a shortened life, and uneven luminescence, of the devices. In contrast, it is well known that the luminance is lowered when the size of the particles is made small. In particular, when the size of particles is less than 5 μm, it is well known in the art that:

the phosphor layer can be made thin, but such a thin layer is incompatible with attaining high luminance and high efficiency.

The thin-film-type device comprises, on an electrically conductive substrate, a pair of dielectric layers, and a homogeneous light-emitting layer sandwiched between the dielectric layers. These films are sub-micron thin films formed by a vacuum process. A typical example of the material for the light-emitting layer is ZnS. This is doped with ions of Mn, Cu, or the like, as luminescence centers. To these basic layers, an insulating layer, to prevent dielectric breakdown; a diffusion barrier layer, to prevent inter-layer movement of ions, and other layers, may be occasionally added.

However, this thin film type is driven by applying a high voltage to the thin laminate structure thereof; therefore, dielectric breakdown may be destructively caused in a defective site of the film. Accordingly, delicate management in the production thereof, such as protection against dust, is required. Thus, the production of a large-area device is not easy.

Accordingly, although the thin film type is suited for display devices, it is not easily made into a large area and it is difficult to simplify its production process. Thus, a uniform large-area light source using this type has not been realized.

SUMMARY OF THE INVENTION

The present invention is an electroluminescence device, including phosphor particles, which phosphor particles give donor-acceptor type luminescence and have an average equivalent sphere diameter of from 1.0 to 12.0 µm and a coefficient of variation of particle diameters of from 3 to 30%.

Other and further features and advantages of the invention will appear more fully from the following description, taken in connection with the accompanying drawings.

DETAILED DESCRIPTION OF THE INVENTION

Figure 1:
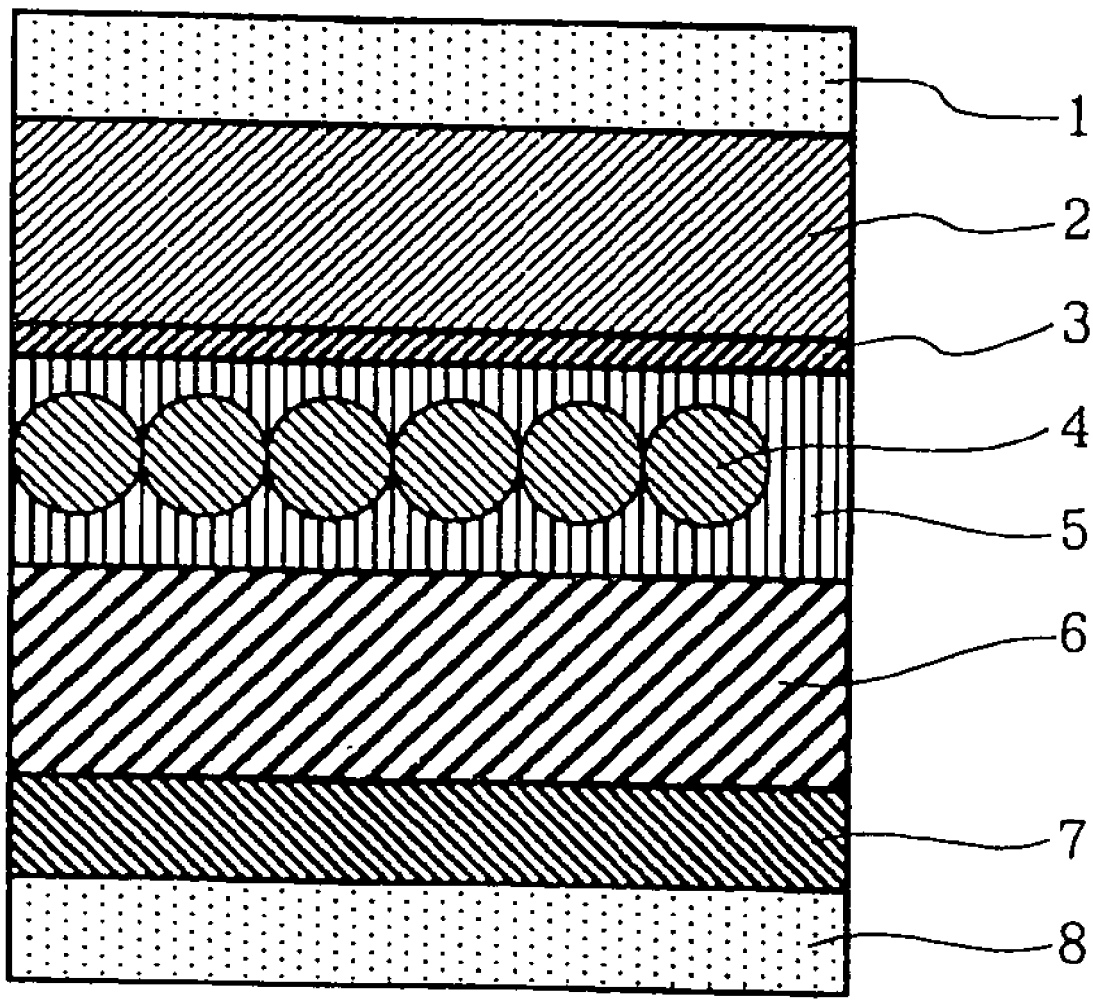
FIG. 1 is an explanatory view showing an example of a structure of electroluminescence device of the present invention.
Figure 2:
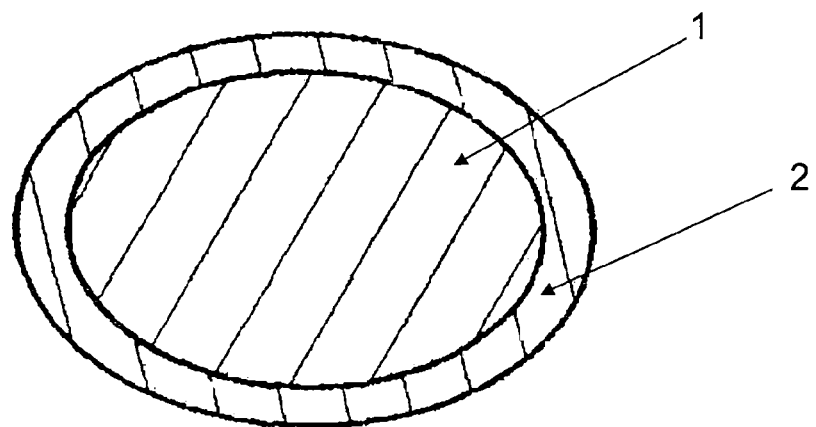
FIG. 2 is an explanatory view showing an example of a particle 1 having a non-luminous shell 2.
Figure 3A:
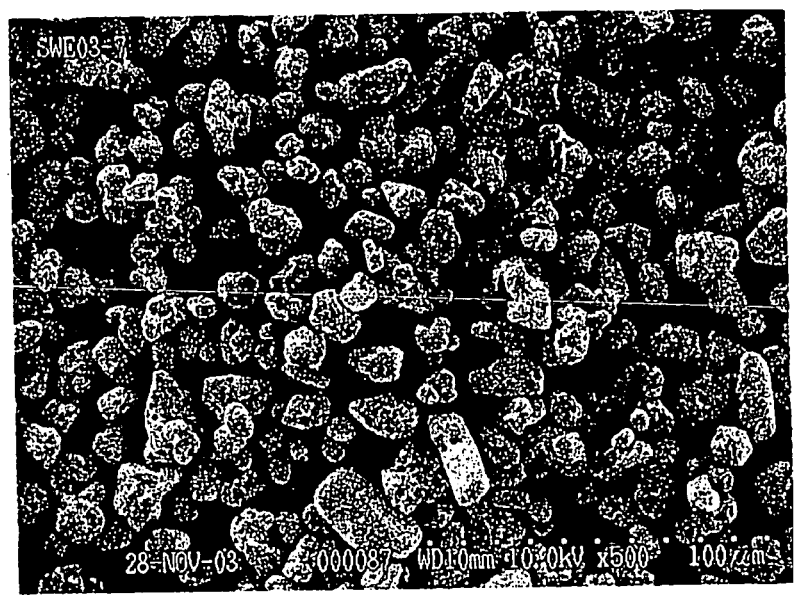
FIG. 3(a) is a photomicrograph of particles having stacking faults. The length between white dots corresponds to 10 µm.
Figure 3B:
FIG. 3(b) shows transmission electron micrographs of cross sections of particles having stacking faults. The length of the white line in the lower portion to the right corresponds to 50 µm.

The present invention provides:
(1) An electroluminescence device, having phosphor particles, which phosphor particles give donor-acceptor type luminescence, and have an average equivalent sphere diameter of 1.0 or more and 12.0 µm or less and a coefficient of variation of equivalent sphere diameters (particle diameters) of 3 or more and 30% or less.
(2) The electroluminescence device according to item (1), wherein at least 30% or more in number of the phosphor particles have 10 or more stacking faults per particle.
(3) The electroluminescence device according to item (1) or (2), wherein each of the phosphor particles is covered with a non-luminous shell having a thickness of 0.01 µm or more.
(4) The electroluminescence device according to any of items (1) to (3), which has a phosphor layer including the phosphor particles, and the phosphor layer has a thickness of 2.0 or more and 25 µm or less.

The host material of particles, which is preferably used in the present invention, is specifically a semiconductor fine particle that is composed of one or more selected from the group consisting of elements of the II group and elements of the III group, and one or more selected from the group consisting of elements of the V group and elements of the VI group, and these elements may be selected at will in accordance with a required luminescence wavelength area.

Examples thereof include CdS, CdSe, CdTe, ZnS, ZnSe, ZnTe, GaP and GaAs. CdS, CdSe, CdTe, ZnS, ZnSe and the like, and a mixed crystal thereof are preferably used.

In order to give luminescence at a low driving voltage, it is necessary to use donor-acceptor type luminescence particles having therein functions of generating electrons and giving luminescence.

As an activator in phosphor particles, at least one ion selected from the group consisting of copper, manganese, silver, gold, and rare-earth elements can be preferably used.

Further, as a co-activator in phosphor particles, at least one ion selected from the group consisting of chlorine, bromine, iodine, and aluminum can be preferably used.

The particle size (particle equivalent sphere diameter) of the phosphor particles for use in the present invention is preferably 1.0 µm or more and 12.0 µm or less, more preferably 1.0 µm or more and 10.0 µm or less, and most preferably 2.0 µm or more and 5 µm or less. The average equivalent sphere diameter (volume weighted average) of the phosphor particles in the electroluminescence device of the present invention is 1.0 µm or more and 12.0 µm or less, preferably 1.0 µm or more and 10.0 µm or less, more preferably 2.0 µm or more and 5.0 µm or less. The coefficient of variation of the particle sizes (particle equivalent sphere diameters) is preferably 3% or more and 30% or less, more preferably 3% or more and 20% or less, and most preferably 3% or more and 15% or less. Herein, the term "equivalent sphere diameter" means the diameter of a sphere whose volume is equivalent to that of an individual phosphor particle. Further, the term "average equivalent sphere diameter" means an average value of the equivalent sphere diameters of phosphor particles. The equivalent sphere diameter of the phosphor particles can be measured, for example, by a device adopting a laser light scattering system, LA-500 (trade name, manufactured by Horiba, Ltd.) or Coulter counter (manufactured by Beckman Coulter Co., Ltd.). In general, the size can be estimated assuming the spheroid from an electron micrograph.

In the production of the EL device of the present invention, however, it is also possible to intentionally use a mixture of particles, which is obtained by preparing plural particle groups having different average particle sizes separately and mixing them.

The phosphor particles for use in the electroluminescence device of the present invention can be formed by a firing process (solid-phase process), which is widely used in the art. For example, in the case of zinc sulfide, fine particle powder having a particle size of 10 to 50 nm is produced by a liquid-phase process, and this powder is used as primary particles. Into this powder are then incorporated impurities called activators or co-activators, which will be donors or acceptors, and then the resultant is fired at a high temperature of 900 to 1300° C., to yield the phosphor particles.

It is also preferable to use a laser ablation process, a double decomposition process and a gas-phase process such as a process based on gas-phase reaction between organic metal compound vapor and hydrogen sulfide gas, and a liquid-phase process such as a process based on thermal decomposition of a precursor. A specific method of the liquid-phase process is appropriately selected in accordance with constituting elements of the particles. For example, the following methods can be applied: a method of decomposing an organic metal compound thermally in a coordinating solvent at high temperature, to yield target semiconductor fine particles, as described in J. Am. Chem. Soc. Vol. 115, p. 8706 (1993); a method of decomposing a precursor and subsequently conducting double decomposition reaction, to yield a target semiconductor, like a reaction between cadmium acetate and thioacetoamide described in J. Mater. Sci. Vol. 35, p. 5933; a method of using elements as supplying sources, and conducting double decomposition reaction associated with redox of the supplying sources, to yield a semiconductor compound, as described in Chem. Mater. Vol. 12, p. 73; a method of producing core/shell CdSe/CdS fine particles in a micelle structure, as described in Mater. Sci. Vol. 35 (No. 6), p. 1375 (2000); and other methods. These precursors can be decomposed by irradiation with ultrasonic waves, microwaves, ultraviolet rays, γ-rays or the like, as well as accelerating the decomposition by heat. In some cases, reaction under pressure, such as hydrothermal reaction, can be used.

When particles are prepared by direct precipitation reaction of a constituting metal ion with a chalcogen anion, without using any precursor of the constituting elements, rapid mixing of solutions of the two is necessary. For this purpose, it is preferable to use a mixer of a double jet type. As such a highly efficient mixer, for example, a device as described in JP-A-10-43570 ("JP-A" means unexamined published Japanese patent application) is useful.

By controlling preparation conditions in the above-mentioned methods, it is possible to obtain donor-acceptor luminescence type fine particles having a size of 1.0 to 12.0 μm (inclusive) for use in the present invention.

By examining particle preparation method based on the above-described methods in a trial error manner, a particle diameter distribution that gives the coefficient of variation as defined in the present invention can be obtained. Also, a monodisperse particle, having the narrow average equivalent sphere size distribution as defined in the present invention, can be obtained not by using the particle preparation method alone but by using the method together with a classification method.

It is preferable in the electroluminescence device of the present invention that 30% or more in number of these phosphor particles has 10 or more stacking faults. More preferably, 60% or more of the particles has 10 or more stacking faults, and particularly preferably 90% or more of the particles has 10 or more stacking faults.

The stacking faults referred to herein mean twin planes and plane interfaces. When zinc sulfide is given as an example, these planes are usually plane defects perpendicular to the {111} plane. Generic description on stacking faults is included in Chapters 1 and 7 in "Lattice Defects (Koshi kekkann)" written by B. Henderson and translated by Masao Dohyama (Maruzen Co., Ltd.) in detail. Stacking faults in zinc sulfide are described by Andrew C. Wright and Ian V. F. Viney, in Philosophical Mag. B, 2001, Vol. 81, No. 3, pp. 279–297.

The stacking fault is evaluated through the observation on a layered structure formed on a side surface of the particles when the phosphor particles are chemically etched with an acid such as hydrochloric acid. The particle having at least 10 or more layers of the above layered structure is the stacking fault particle, which is preferably used in the present invention.

Regarding an interval between the above stacking faults as surface defects, it is known in the art that there are minute structures.

In fact, when the stacking fault particles for use in the present invention are pulverized and transmission electron microscope observation is made on the particle fragments, it is observed that the particle has 10 or more stacking faults at an interval of 10 nm or smaller. The particle for use in the present invention preferably has the minute structure regarding the stacking faults at an interval of 10 nm or smaller.

It is preferable that the phosphor particles for use in the present invention have, on the surface of each of them, a non-luminous shell layer. The shell is preferably formed by a chemical method following the preparation of the semiconductor fine particles, which will be cores of the phosphor particles. The thickness of the shell layers is preferably 0.01 μm or more, and more preferably the thickness is 0.01 μm or more and 1.0 μm or less. Particularly preferably, the thickness is 0.02 μm or more and 0.5 or less.

The non-luminous shell layer can be made of a substance that has the same composition as those formed on the host phosphor particle but contains no luminescence centers. The shell layer can also be formed by epitaxially growing, on the host phosphor particle, a substance which has a different composition from that of the particle.

Further, the shell layer can be formed by causing the phosphor particle to absorb ultrafine particles, such as $Y_2O_3$, $BaTiO_3$ or ZnO ultrafine particles, and then firing the phosphor particle.

Also, as disclosed in JP-A-4-230996 or JP-A-11-260557, metal oxide or metal nitride of aluminum, titanium, silicon, or the like, or a composite mixture thereof may be used.

An important function that the non-luminous shell layer is expected to exhibit is to make the incident angle of the light large, when light generated in the particle reaches the interface between the particle and the dispersing medium around this particle. As a result of this, it is expected that a take-off efficiency of the light rise. It is preferable that there is no large difference between the refractive index of the host phosphor and that of the material, which constitutes the shell layer.

Also, the coating layer protects the particles from moisture, suppressing decomposition and blackening of the particle at the time of driving.

The phosphor layer of the EL device of the present invention is defined as a layer containing the phosphor particles. A preferable thickness thereof, which needs to be larger than the particle size for minimizing the unevenness on the layer, is preferably 2.0 μm or more and 25 μm or less, more preferably 3.0 μm or more and 20 μm or less.

The EL device of the present invention is preferably subjected to heating treatment after the formation of a phosphor layer, according demand. It is preferable to heat the device in a non-oxidizing atmosphere, such as an atmosphere containing no oxygen, a nitrogen atmosphere, a hydrogen sulfide atmosphere, or a hydrogen gas atmosphere. The temperature is preferably from 100 to 1000° C., and the heating time is preferably from 30 minutes to 3 hours.

In ordinary embodiments of the EL device of the present invention, it comprises at least a dielectric layer, a phosphor layer, and a pair of electrodes which sandwiches these layers, and at least one of the electrodes is a transparent electrode.

The transparent electrode for use in the electroluminescence device of the present invention may be formed as follows. A transparent conductive substance such as indium tin oxide (ITO), tin oxide, antimony-doped tin oxide, zinc-doped tin oxide, or zinc oxide is adhered and formed into a film, on a transparent film such as a polyethylene terephthalate base or a triacetyl cellulose base as well as a glass substrate, for example, by deposition, coating, or printing.

The transparent conductive film may be formed by sputtering, vacuum evaporation, or such other gas-phase process. The film may be formed by coating or screen-printing of an ITO paste etc., or by heating the film.

Also, a multi-layer structure having a silver thin film interposed between high refractive index layers may be used. In addition, a conductive polymer including a conjugated polymer such as polyaniline or polypyrrole may be preferably used.

The back electrode, which is present on the side from which light is not taken out, may be made of any material that has electric conductivity. The material is appropriately selected from metals such as gold, silver, platinum, copper, iron and aluminum; graphite, and other materials, considering the form of the device to be produced, the temperature in producing steps, and other factors. A transparent electrode such as an ITO electrode may be used, as long as it has electric conductivity.

The dielectric layer in the present invention may be made of any material that has a high dielectric constant, high insulating property, and a high dielectric breakdown voltage. The material can be selected from metal oxides and metal nitrides. Examples thereof include $BaTiO_3$, $KNbO_3$, $LiNbO_3$, $LiTaO_3$, $Ta_2O_3$, $BaTa_2O_6$, $Y_2O_3$, $Al_2O_3$, and AlON. Such a material may be provided as a homogeneous film or may be used as a film having grain structure; for example, use can be made of a film composed of $BaTiO_3$ fine particles and $BaTiO_3$ sol as described in Mat. Res. Bull. Vol. 36, p. 1065.

In general, though it depends on the dielectric constant of the film, the thickness of the film is preferably made as thin as possible as long as dielectric breakdown, or dielectric breakdown at a defective portion of the film due to an alien substance, or the like, is not caused. This is because voltage applied to the phosphor layer can be made large. Considering this matter, the thickness is appropriately selected in accordance with the structure of the film or the preparation process thereof.

The process for preparing the dielectric film may be a gas-phase process such as sputtering or vacuum evaporation. In this case, the thickness of the film is usually from 100 nm to 1000 nm. The film can also be formed by applying a dispersion or sol of dielectric fine particles by a coating method such as spin coating, dip coating, bar coating, screen printing or spray coating, and then sintering the resulting film by means of an electric furnace, an infrared ray lamp, microwaves or the like. In the case of using ferroelectric fine particles, the film thickness of the dielectric layer preferably ranges from 10 μm to 50 μm.

In order to provide a thin phosphor layer adjacently on the dielectric layer, it is necessary that the phosphor layer side surface of the dielectric layer has sufficient smoothness. For this purpose, in the case of the film made of dielectric particles, it is preferable to make this film surface smooth, by providing a second dielectric layer having good smoothness as described in U.S. Pat. No. 5,432,015, or by filling gaps between $BaTiO_3$ particles with $BaTiO_3$ sol as described in Mat. Res. Bull., Vol. 36, p. 1065.

As an organic binder that can be used in the phosphor layer and the dielectric layer, a polymer having a relatively high dielectric constant, such as cyanoethyl cellulose-series resin; and a resin, such as a polyethylene, a polypropylene, a polystyrene-series resin, a silicone resin, an epoxy resin, or a vinylidene fluoride, can be used. Further, use can be made of one prepared by mixing any of those organic polymers or resins with, for example, $BaTiO_3$ or $SrTiO_3$ fine particles having a high dielectric constant in an appropriate amount, to adjust the dielectric constant. As a dispersing method, a homogenizer, a planetary mill or mixer, a roll mill or mixer, an ultrasonic dispersing machine, or the like can be used.

If necessary, an additional layer may be provided on the EL device of the present invention.

For example, to prevent dielectric breakdown owing to pinhole or the like, or to prevent undesirable shifting of the constituting elements between the dielectric layer and the phosphor layer, a thin film such as a silicon oxide film or an aluminum oxide film can be laid adjacent to the phosphor layer. Further, to inject electrons effectively into the light-emitting layer, an injection layer such as a yttrium oxide thin film or a hafnium oxide thin film may be provided adjacent to the light-emitting layer.

The EL device of the present invention may have a device structure wherein a transparent electrode layer, a dielectric layer, a phosphor layer, another dielectric layer, and a back electrode are successively arranged on a transparent substrate, thereby taking out light from the side of the substrate; or a device structure wherein an electrode-layer, a dielectric layer, a phosphor layer and a transparent electrode layer are successively arranged on a light non-transmissible substrate, thereby taking out light from the side opposite to the substrate. A structure wherein dielectric layers are arranged on both sides of a phosphor layer is preferable for stable operation. In this case, however, it is necessary that the dielectric layer on the side from which light is taken out has sufficient light transmissibility. Further, if necessary, light can be taken out from an edge portion of the EL device. In this case, the two electrodes are made of a light reflective material.

It is preferable that the EL device of the present invention is worked, at the end of its production, with a suitable sealing material, so as to exclude effect of humidity from external environment. It is also preferable that, in the case that the substrate itself of the device has sufficient shielding property, a moisture or oxygen shielding sheet is put over the produced device and the surrounding of the device is sealed with a hardening material such as epoxy resin. Also, in order to keep the planer device from curling, shielding sheets may be bonded to both sides thereof. If the substrate of the device has water permeability, it is preferable that the shielding sheet is arranged to both sides.

The material for the above shielding sheet may be selected from glass, metal, plastic film, or the like, according to the application. For example, a moisture-proof film as disclosed in JP-A-2003-249349 may be preferably used, which has a multi-layer structure including a layer containing silicon oxide and a layer containing an organic polymer compound. As another example, chlorotrifluoroethylene resin may be preferably used.

The sealing step is preferably conducted in a vacuum or an atmosphere purged with an inert gas as disclosed in JP-B-63-27837 ("JP-B" means examined Japanese patent publication). Prior to the sealing step, as disclosed in JP-A-5-166582, the moisture content should be sufficiently reduced.

In manufacturing the EL device, a water-absorbing layer is preferably formed at an inner side to the moisture-proof film. The water-absorbing layer is preferably formed of raw materials having high water-absorbing property and high water retention property, such as nylon or polyvinyl alcohol. A high transparency is also an important factor. Any other material such as cellulose or paper can be preferably used insofar as the material has high transparency.

As disclosed in JP-A-4-230996 or U.S. Pat. No. 5,418,062, preferably, the phosphor particles may be coated with a metal oxide or metal nitride for improving the moisture-proof property, in addition to imparting the moisture-proof property through the formation of the film.

A structural example of the electroluminescence device of the present invention is shown in FIG. 1. Between moisture shielding films 1 and 8, there are provided a film base 2 of several tens micrometers, an ITO layer 3 (transparent electrode) of several tens nanometers, a phosphor layer 5 comprising phosphor particles 4, such as ZnS or the like, dispersed in an organic binder; a dielectric layer 6 comprising a ferromagnetic substance, such as $BaTiO_3$ or the like, dispersed in an organic binder; and an electrode 7, made of a metal film or a conductive paste.

As another preferable embodiment of the present invention the following can be mentioned: electroluminescence particles that give donor-acceptor type luminescence, and have an average sphere equivalent diameter of 0.1 μm or more and 5.0 μm or less, and a coefficient of variation of the particle diameter is 3% to 30%.

The electroluminescence device of the present invention exhibits superior effects that it gives high luminescence and high efficiently, even at a low voltage. The electroluminescence particles for use in this invention are suited to form a phosphor layer of the above EL device. Especially, the EL particles are suited for particle-dispersion type thin electroluminescence device.

The present invention will be described in more detail by way of the following examples, but the present invention is not limited thereto.

EXAMPLES

Example 1

1) Preparation of Zinc Sulfide Fine Particles

To 25 g of ZnS particle powder having an average particle diameter of 20 nm was added 5 g of $MgCl_2$ as a flux, thereto were added magnesium oxide, potassium iodide, aluminum oxide powder, each in a desired amount, as a flux, to control particle diameter; and further thereto was added copper sulfate in an amount of 0.07 mol % based on ZnS. The resultant dry powder was put into a crucible made of alumina, fired at 1250° C. for 1 hour, and then rapidly cooled. Thereafter, the powder was taken out and then pulverized in a ball mill. The resultant was further added with water to solate, followed by ultrasonic dispersion. Thereto were added $ZnCl_2$ in an amount of 5 g and copper sulfate in an amount of 0.10 mol % based on ZnS. Thereafter, 1 g of $MgCl_2$ was added thereto, to-prepare a dry powder. Again, the powder was put into an alumina crucible and fired at 700° C. for 2 hours. The firing was conducted while 10% hydrogen sulfide gas as an atmosphere was flowed.

The particles after the firing were again pulverized, and dispersed and sedimented in $H_2O$ of temperature 40° C. The supernatant was removed and the precipitation was washed. Thereafter, a 10% solution of hydrochloric acid was added thereto, and the precipitation was dispersed and sedimented. The supernatant was removed and unnecessary salts were removed. The precipitation was dried. Furthermore, the precipitation was washed with a 10% KCN solution heated to 70° C., to remove Cu ions and others from the surface. The thus-produced particles were referred to as Phosphor particles A-1.

Phosphor particles A-2 to A-9 were produced in the very same manner as Phosphor particles A-1, except that the particle diameter of the primary particles was changed, that the firing time, and the amount and the kind of the flux in the first firing were changed, and that the phosphor particles were subjected to classification. Specifically, the flux was changed or partially changed to NaCl, KCl, $NH_3Cl$ or the like, or such a salt was further added. In each of the thus-prepared Phosphor particles A-1 to A-9, at least 30% or more of the particles had 10 or more stacking faults per particle.

A frequency at which the particles had the stacking faults was obtained as follows: the resultant phosphor particles were chemically etched with a 6N hydrochloric acid and then 600 particles were selected, followed by the scanning electron microscope observation thereon.

Further, prior to etching, the particles were determined for the average equivalent sphere diameter and its coefficient of variation using Coulter counter. The obtained results are shown in Table 1.

TABLE 1

|  | Average equivalent sphere diameter | Coefficient of variation of equivalent sphere diameter |
| --- | --- | --- |
| A-1 | 23.3 μm | 40% |
| A-2 | 13.1 μm | 30% |
| A-3 | 10.0 μm | 23% |
| A-4 | 6.3 μm | 39% |
| A-5 | 0.7 μm | 34% |
| A-6 | 7.8 μm | 25% |
| A-7 | 4.5 μm | 27% |
| A-8 | 3.1 μm | 20% |
| A-9 | 1.5 μm | 15% |

Those particles were evaluated for a luminescence spectrum in the case of excitation of 340 nm at the room temperature and the liquid nitrogen temperature using a fluorescence spectrometer, Fluorolog-3 (trade name, manufactured by Horiba, Ltd.). Each of Samples A-1 to A-9 had a luminescence peak around 500 nm; the luminescence was considerably decreased at a low temperature. Thus, it was confirmed that these particles gave the donor-acceptor type luminescence.

2) Application of a Phosphor Layer

Each of the phosphors prepared in the item 1) was dispersed in a cyanoresin solution having a concentration of 30%, and then applied onto a film substrate coated with ITO (indium tin oxide), to have a thickness shown in Table 2. In this manner, coating samples B-1 to B-45 were prepared. In each case, the coating solution was adjusted in such a manner that the amount of the applied phosphor would be 100 g/m².

TABLE 2

| Coating sample No. | Used phosphor particles | Thickness of the phosphor layer (μm) | Remarks |
|---|---|---|---|
| B-1 | A-1 | 50 | Comparative example |
| B-2 | A-1 | 30 | Comparative example |
| B-3 | A-1 | 20 | Comparative example |
| B-4 | A-1 | 8 | Comparative example |
| B-5 | A-1 | 3 | Comparative example |
| B-6 | A-2 | 50 | Comparative example |
| B-7 | A-2 | 30 | Comparative example |
| B-8 | A-2 | 20 | Comparative example |
| B-9 | A-2 | 8 | Comparative example |
| B-10 | A-2 | 3 | Comparative example |
| B-11 | A-3 | 50 | This invention |
| B-12 | A-3 | 30 | This invention |
| B-13 | A-3 | 20 | This invention |
| B-14 | A-3 | 15 | This invention |
| B-15 | A-3 | 11 | This invention |
| B-16 | A-4 | 50 | Comparative example |
| B-17 | A-4 | 30 | Comparative example |
| B-18 | A-4 | 20 | Comparative example |
| B-19 | A-4 | 8 | Comparative example |
| B-20 | A-4 | 3 | Comparative example |
| B-21 | A-5 | 50 | Comparative example |
| B-22 | A-5 | 30 | Comparative example |
| B-23 | A-5 | 20 | Comparative example |
| B-24 | A-5 | 8 | Comparative example |
| B-25 | A-5 | 3 | Comparative example |
| B-26 | A-6 | 50 | This invention |
| B-27 | A-6 | 30 | This invention |
| B-28 | A-6 | 20 | This invention |
| B-29 | A-6 | 15 | This invention |
| B-30 | A-6 | 10 | This invention |
| B-31 | A-7 | 50 | This invention |
| B-32 | A-7 | 30 | This invention |
| B-33 | A-7 | 20 | This invention |
| B-34 | A-7 | 8 | This invention |
| B-35 | A-7 | 5 | This invention |
| B-36 | A-8 | 50 | This invention |
| B-37 | A-8 | 30 | This invention |
| B-38 | A-8 | 20 | This invention |
| B-39 | A-8 | 8 | This invention |
| B-40 | A-9 | 2 | This invention |
| B-41 | A-9 | 50 | This invention |
| B-42 | A-9 | 30 | This invention |
| B-43 | A-9 | 20 | This invention |
| B-44 | A-9 | 8 | This invention |
| B-45 | A-9 | 3 | This invention |

3) Preparation of a Slurry for a Dielectric Layer

To 10 mL of ethanol was added 0.37 g of titanium tetraisopropoxide. While the mixture solution was stirred, thereto was added 5 mL of a 4% solution of lactic acid in ethanol. Further, thereto was added 5 mL of an aqueous acetic acid solution containing 0.51 g of barium acetate, and subsequently the resultant solution was allowed to stand at 60° C. for 5 hours under stirring. To the solution under stirring, thereto was added 1.5 g of barium titanate particles (X7R (trade name), manufactured by Cabot Corp.) that were dispersed in-advance in a mixture solution of water and methanol (1:1). While the solution was cooled, it was subjected to treatment with ultrasonic waves for 30 minutes, to prepare a homogeneous slurry.

4) Formation of a Dielectric Layer

Onto an aluminum sheet having a thickness of 80 μm as a back electrode, the above-prepared slurry was applied by a screen printing method. After the application, the resultant was dried at 100° C. for one hour, and then subjected to heat treatment at 120° C. for 3 hours. The thus-formed film had good surface smoothness and the thickness thereof was 18 μm.

5) Sealing

A silver paste and a copper wire were used to form a terminal for external connection, from the transparent electrode of the above-mentioned device. Then, the phosphor layer and the dielectric layer were placed facing each other, and brought in close contact. They were subjected to thermocompression bonding, using a heat roller heated to 170° C. Then, both surfaces of the thus-obtained device were covered with chlorotrifluoroethylene shielding sheets, and they were subjected to thermocompression bonding, to seal the device. The shielding process was carried out in a dry $N_2$ gas atmosphere.

6) Measurement of Luminescence Property

A sine-wave signal generator and a power amplifier were used to apply an alternating-current electric field to the thus-prepared device, to measure luminescence intensity thereof with a luminance photometer BM-9 (trade name) manufactured by Topcon Corp. As driving conditions, a frequency of 1 kHz and a voltage of 200 V were used. The results are shown in Table 3. Luminance is shown as relative luminance.

TABLE 3

| Coating sample No. | Relative luminance | Notes | Remarks |
|---|---|---|---|
| B-1 | 100 | — | Comparative example |
| B-2 | 100 | — | Comparative example |
| B-3 | 90 | No luminescence after several minutes | Comparative example |
| B-4 | No luminescence | — | Comparative example |
| B-5 | No luminescence | — | Comparative example |
| B-6 | 80 | — | Comparative example |
| B-7 | 100 | — | Comparative example |
| B-8 | 90 | — | Comparative example |
| B-9 | No luminescence | — | Comparative example |
| B-10 | No luminescence | — | Comparative example |
| B-11 | 110 | — | This invention |
| B-12 | 115 | — | This invention |
| B-13 | 130 | — | This invention |
| B-14 | 135 | — | This invention |
| B-15 | 120 | — | This invention |
| B-16 | 5 | — | Comparative example |
| B-17 | 10 | — | Comparative example |
| B-18 | 20 | — | Comparative example |
| B-19 | 60 | — | Comparative example |
| B-20 | 110 | No luminescence after several minutes | Comparative example |
| B-21 | 1 | — | Comparative example |
| B-22 | 3 | — | Comparative example |
| B-23 | 10 | — | Comparative example |
| B-24 | 20 | — | Comparative example |
| B-25 | 80 | — | Comparative example |
| B-26 | 110 | — | This invention |
| B-27 | 120 | — | This invention |
| B-28 | 140 | — | This invention |

TABLE 3-continued

| Coating sample No. | Relative luminance | Notes | Remarks |
|---|---|---|---|
| B-29 | 150 | — | This invention |
| B-30 | 130 | — | This invention |
| B-31 | 115 | — | This invention |
| B-32 | 130 | — | This invention |
| B-33 | 160 | — | This invention |
| B-34 | 200 | — | This invention |
| B-35 | 160 | — | This invention |
| B-36 | 110 | — | This invention |
| B-37 | 130 | — | This invention |
| B-38 | 240 | — | This invention |
| B-39 | 230 | — | This invention |
| B-40 | 105 | — | This invention |
| B-41 | 120 | — | This invention |
| B-42 | 180 | — | This invention |
| B-43 | 250 | — | This invention |
| B-44 | 260 | — | This invention |
| B-45 | 250 | — | This invention |

As is clear from Table 3, the EL devices according to the present invention gave high luminance.

Example 2

To a closed-type reaction kettle heated to 300° C. were added 0.6 M of sodium sulfide aqueous solution and 0.6 M of zinc nitrate aqueous solution at an addition rate of 0.01 mole per minute over one hour. In advance of this process, 1 liter of a 0.6 M NaCl solution was prepared in the reaction kettle. Sulfuric acid was used to adjust the pH of the solution to 2 or less. After pH was adjusted, a solution of copper sulfate was quantitatively added to the solution at a rate of 0.1 mole % based on zinc. In this way, particles were prepared, to yield Particles C-1 having an average particle diameter of 3.0 μm and a coefficient of variation of 24%. Particles C-2 to C-6 were prepared in the same manner as particles C-1, except that the following conditions were changed: the concentration of NaCl, the temperature, the rate of the addition, the pH, and the excessive amount of sodium sulfide added in the reaction kettle in advance. Characteristics of the respective particles are shown in Table 4. The particles were lightly crushed in a ball mill, to produce particles through which electron rays were able to be transmitted, and the number of stacking faults was measured with a transmission electron microscope.

TABLE 4

| | Average equivalent sphere diameter | Coefficient of variation | Percentage of particles having 10 or more stacking faults |
|---|---|---|---|
| C-1 | 3.0 | 24% | 19% |
| C-2 | 1.9 | 18% | 26% |
| C-3 | 2.1 | 20% | 35% |
| C-4 | 1.8 | 19% | 53% |
| C-5 | 2.0 | 19% | 66% |
| C-6 | 2.1 | 21% | 70% |

Devices D-1 to D-6 were prepared in the same manner as Device B-45 in Example 1, except that respective kinds of particles shown in Table 4 were used. In the very same way as in Example 1, the luminance property of the devices was evaluated. The results are shown in Table 5. The luminance of each of the devices was evaluated as luminance relative to the luminance of the device B-1, which was defined as 100.

TABLE 5

| | Luminance |
|---|---|
| D-1 | 110 |
| D-2 | 120 |
| D-3 | 160 |
| D-4 | 230 |
| D-5 | 300 |
| D-6 | 300 |

The electroluminescence devices according to the present invention, in which 30% or more of phosphor particles had 10 or more stacking faults, exhibited high luminance property.

Example 3

The Particles C-5 according to the present invention, produced in Example 2, were used as seed crystals, and each of the particles was provided with a zinc sulfide shell of a thickness of 0.25 μm. The thus-prepared particles had an average sphere diameter of 2.5 μm with the coefficient of variation thereof of 21%. An electroluminescence device was prepared in the same manner as Device D-5 in Example 2, except for using the thus-obtained particles. The luminance thereof was measured. The relative luminance thereof was 400.

Having described our invention as related to the present embodiments, it is our intention that the invention not be limited by any of the details of the description, unless otherwise specified, but rather be construed broadly within its spirit and scope as set out in the accompanying claims.

What I claim is:

1. An electroluminescence device, comprising a pair of electrodes, a dielectric layer, and a phosphor layer comprising phosphor particles,
    wherein the dielectric layer and the phosphor layer are sandwiched between the electrodes, and
    wherein the phosphor particles give donor-acceptor type luminescence, the phosphor particles having an average equivalent sphere diameter of 1.0 μm or more and 12.0 μm or less, a coefficient of variation of equivalent sphere diameters of 3% or more and 30% or less, and at least 30% or more in number of the phosphor particles having 10 or more stacking faults per particle.

2. The electroluminescence device as claimed in claim 1, wherein each of the phosphor particles is covered with a non-luminous shell having a thickness of 0.01 μm or more.

3. The electroluminescence device as claimed in claim 1, which has a phosphor layer comprising the phosphor particles, and the phosphor-particle layer has a thickness of 2.0 μm or more and 25 μm or less.

4. The electroluminescence device as claimed in claim 1, wherein at least one of the electrodes is a transparent electrode.

5. An electroluminescence device, comprising phosphor particles, which phosphor particles give donor-acceptor type luminescence, and have an average equivalent sphere diameter of 1.0 μm or more and 12.0 μm or less and a coefficient of variation of equivalent sphere diameters of 3% or more and 30% or less; and at least 30% or more in number of the phosphor particles have 10 or more stacking faults per particle.

6. The electroluminescence device as claimed in claim 5, wherein each of the phosphor particles is covered with a non-luminous shell having a thickness of 0.01 μm or more.

7. The electroluminescence device as claimed in claim 5, which has a phosphor layer comprising the phosphor particles, and the phosphor-particle layer has a thickness of 2.0 μm or more and 25 μm or less.

* * * * *